No. 666,563. Patented Jan. 22, 1901.
A. G. SARGENT.
CLUTCH.
(Application filed May 26, 1897.)
(No Model.) 3 Sheets—Sheet 1.
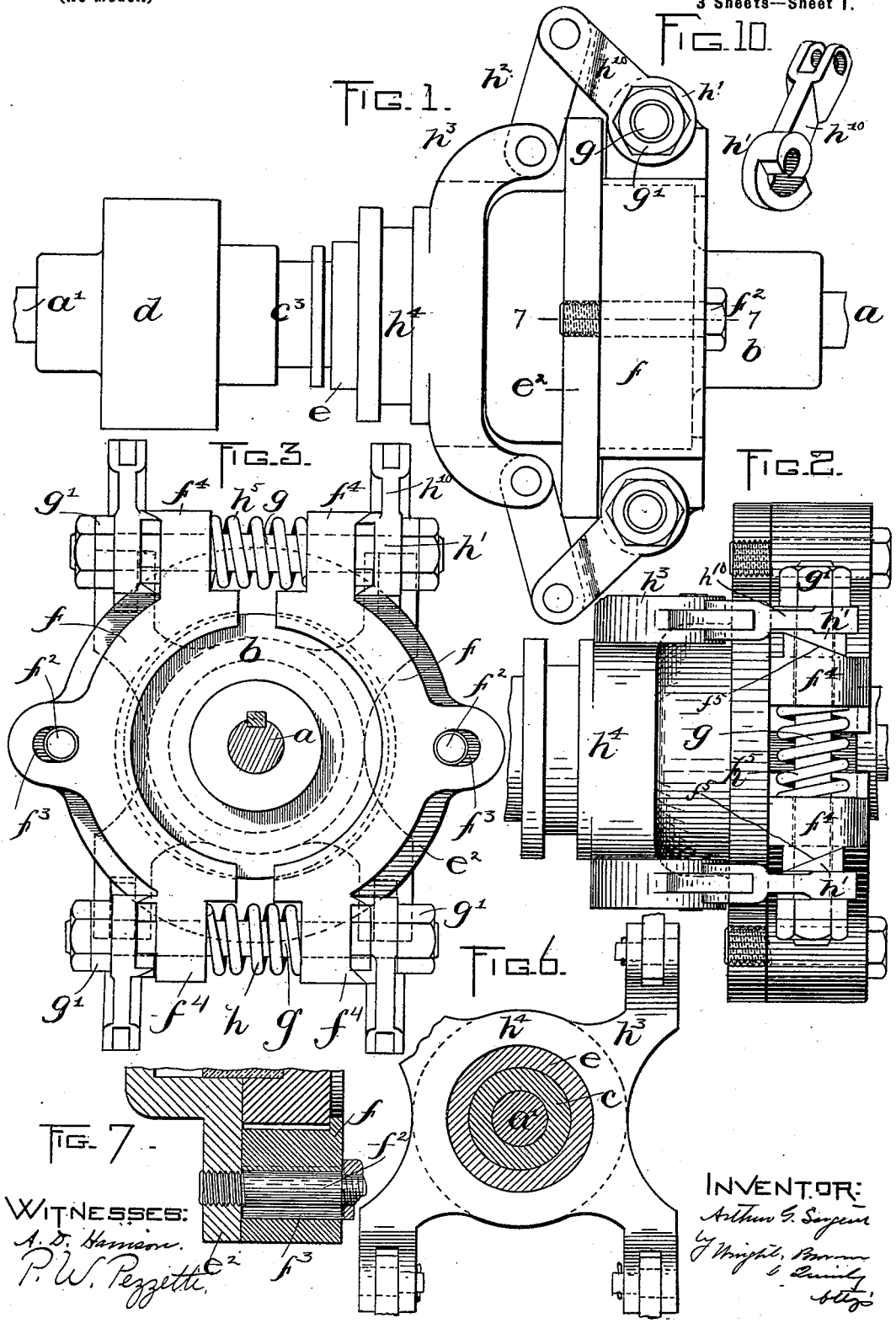

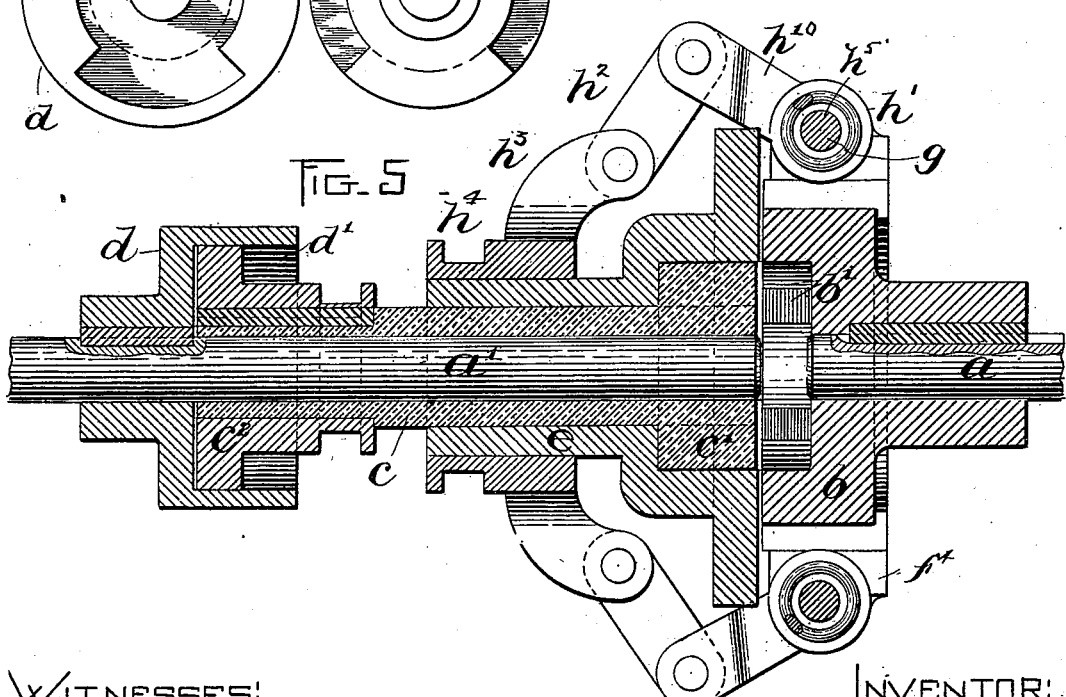

No. 666,563. Patented Jan. 22, 1901.
A. G. SARGENT.
CLUTCH.
(Application filed May 26, 1897.)
(No Model.) 3 Sheets—Sheet 3.
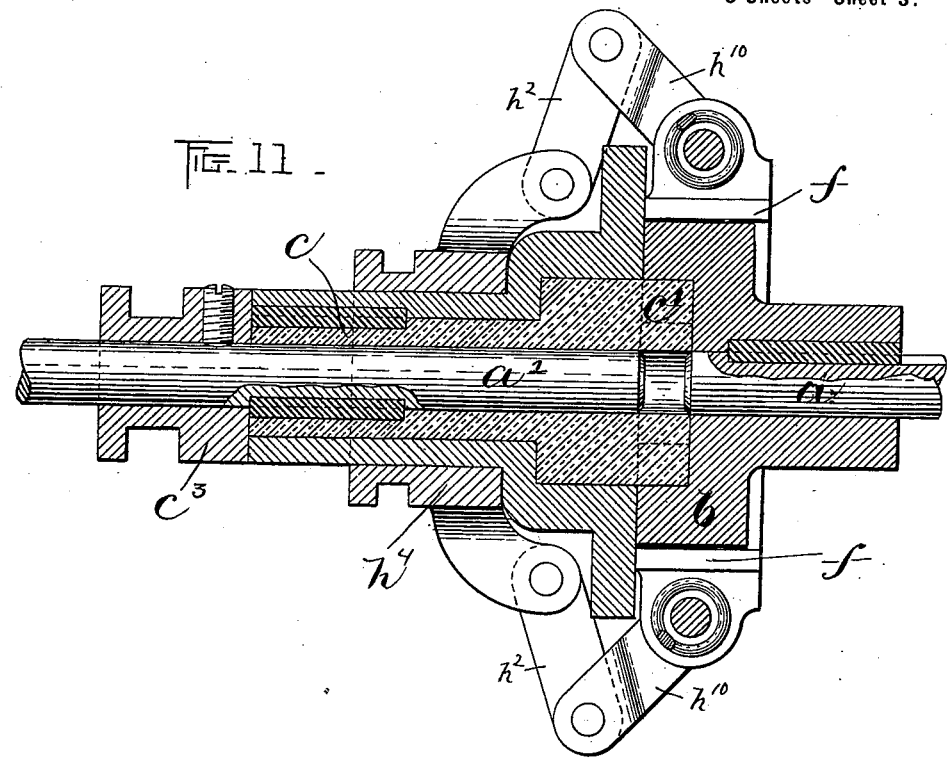
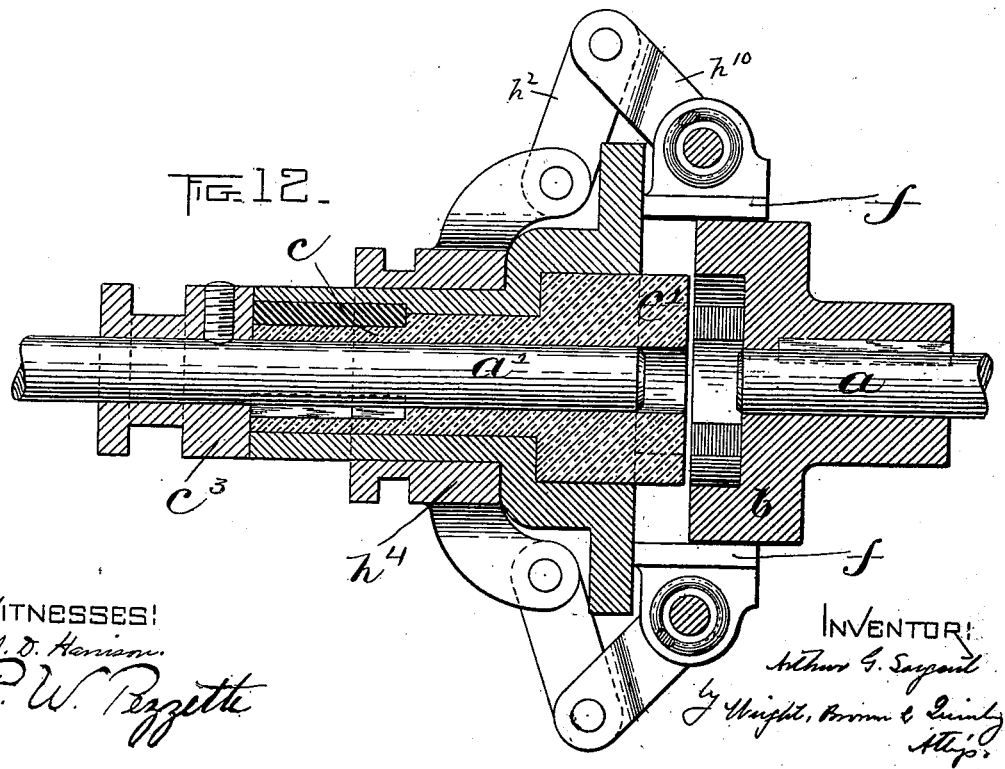
WITNESSES: INVENTOR:

UNITED STATES PATENT OFFICE.

ARTHUR G. SARGENT, OF EAST TILTON, NEW HAMPSHIRE, ASSIGNOR TO THOMAS H. WORRALL, OF LACONIA, NEW HAMPSHIRE.

CLUTCH.

SPECIFICATION forming part of Letters Patent No. 666,563, dated January 22, 1901.

Application filed May 26, 1897. Serial No. 638,224. (No model.)

*To all whom it may concern:*

Be it known that I, ARTHUR G. SARGENT, of East Tilton, in the county of Belknap and State of New Hampshire, have invented certain new and useful Improvements in Clutches, of which the following is a specification.

This invention has relation to clutches for coupling and uncoupling rotating shafts placed in alinement or a shaft and a pulley, and has for its object to provide certain improvements in the same whereby the clutch members may be locked together either frictionally or positively and whereby the frictionally-acting mechanism may be actuated with greater ease and with greater certainty than heretofore.

To these ends the invention consists in the combination and arrangement of parts, all as clearly illustrated upon the drawings and now to be fully described, and pointed out in the claims hereto annexed.

Reference is to be had to the accompanying drawings, and to the letters marked thereon, forming a part of this specification, the same letters designating like parts or features, as the case may be, wherever they occur.

Of the drawings, Figure 1 represents in side elevation a clutch embodying my invention. Fig. 2 represents a plan view of a portion of the same. Fig. 3 represents a front end elevation. Figs. 4 and 5 represent longitudinal sections through the same, showing the clutch members in different positions. Fig. 6 represents in detail means for connecting the sections of the split clamping-ring to one of the sliding sleeves. Fig. 7 represents a detail section on line 7 7 of Fig. 1. Figs. 8 and 9 represent face views of the coacting coupling-jaws for connecting one of the clutch members to its supporting-shaft. Fig. 10 represents a detail perspective view of one of the cam-hubs and its arm. Figs. 11 and 12 represent other embodiments of my invention which I sometimes prefer to employ.

Referring to Figs. 1 to 9 of the drawings and to the particular embodiment of my invention shown thereby, $a$ $a'$ indicate two disconnected driving and driven shafts, which are placed in axial alinement and which it is desired to connect by means of the improved mechanism to be described.

On the end of shaft $a$ is placed a clutch member consisting of a disk $b$, keyed to the said shaft and provided in its outer face with a socket of an irregular shape to receive a movable member or jaw. Upon the end of the shaft $a'$ is mounted the other clutch member, including a sleeve $c$, provided on its end with a jaw or projection $c'$, similar in shape to that illustrated in Fig. 9, which is adapted to fit snugly in the socket in the clutch member $b$, so as to positively connect the sleeve and the clutch member together. The said sleeve is mounted loosely upon the shaft $a'$, so as to slide thereon, and is provided on its opposite end with a coupling-jaw $c^2$ of the shape shown in Fig. 9 (which is a face view thereof) and secured thereto by a key.

Rigidly secured to the shaft $a'$, beyond the end of the shaft $c$, is the female jaw $d$ of the coupling, provided with a deep socket of the shape shown in Fig. 8, in which the other member $c^2$ may slide, so as to always maintain a rigid connection between the shaft $a'$ and the sleeve $c$. The coupling jaw or sleeve $c^2$ is formed with a groove $c^3$ to receive the end of a shipping-lever, by means of which the sleeve may be shifted longitudinally of the shaft $a'$ to bring the jaw $c'$ into engagement with the clutch member $b$ on the shaft $a$ and rigidly connect the shafts $a'$ and $a$, the socket in the jaw $d'$ being deep enough to permit the jaw $c^2$ to be moved back and forth without being moved out thereof.

Mounted upon the sleeve $c$ is another sleeve $e$, provided with a deep socket $e'$ to receive the jaw $c'$ of the positive clutch mechanism and with a flange $e^2$ to confront the face of the clutch member $b$. By reason of the jaw $c'$ lying in the socket in the sleeve $e$ and the said socket being deep enough to prevent the jaw from leaving it the said sleeve $e$ is connected to the shaft $a'$ to turn therewith, although the sleeve $c$ is free to slide relatively thereto.

The friction-clutch mechanism comprises, in addition to the clutch member $b$, the two sections $f\,f$ of a split ring, each section having a flange $f'$ projecting inward beyond the periphery of the clutch member $b$ and each being connected to the flange $e^2$ of the sleeve $e$ by a centrally-disposed pin or pins $f^2$, passing through an elongated slot $f^3$ and screwed into an aperture in the flange $e^2$, as shown in Figs. 3 and 7. Each ring is provided with two outwardly-projecting ears $f^4$, and passing through the opposing ears of the two ring-sections are bolts $g$ $g$, having check-nuts $g'$ threaded on their outer ends to limit the outward movement of the said ring-sections. Springs $h$ $h$, coiled about the bolts $g$, operate to normally hold the ring-sections apart; but they may be compressed when the said sections are forced inward by means which I shall now describe.

The outer faces of the two opposing ears are formed with oppositely-arranged spiral cams $f^5 f^5$, and arranged between the ears and the nuts $g'$ $g'$ are rotatable power devices, consisting of oppositely-arranged cams $h'$ $h'$, which when rotated bear against the cams $f^5 f^5$ and force the ring-sections inward against the peripheral surface of the clutch member $b$. The said rotatable power devices may be turned by any suitable means or gearing, but I sometimes employ the means shown, which consists of an arm $h^{10}$, connected to each of the cam-hubs and having its outer end connected by a link $h^2$ to outwardly and forwardly projecting ears $h^3$, formed on a shipping-lever sleeve $h^4$, arranged to slide on the sleeve $e$.

When it is desired to clutch the shafts $a$ and $a'$ frictionally together, the shipper-lever sleeve $h^4$ is moved longitudinally of the shaft $a'$, which, through the links $h^2$, the arms $h'$, and the power devices, forces the ring-sections against the clutch member $b$ with such force as to bind them together. Then by shifting the sleeve $c'$ toward the shaft $a$ by means of the sleeve $c^2$, which is secured thereto, the jaw $c'$ is forced into the socket in the member $b$ and the shafts are clutched positively together. Thus it will be seen that I provide a clutch mechanism which operates to clutch the two shafts together either frictionally or positively, as desired, and which is simple in construction and easy of operation.

Of course it will be understood that I do not limit myself to the particular mechanism which I have just described, as my invention is capable of being expressed in many different ways. The particular form of rotatory "power devices" before referred to may be varied as described, any rotating device which operates to draw the ring-sections together being, so far as this invention is concerned, the equivalent of the oppositely-acting cams. Again, other multiplying means may be interposed between the rotatable power devices and the sliding sleeve $h^4$ for increasing the movement of the said cams.

If desired, the positive clutching of the two shafts can be obtained by means of the mechanism illustrated in Figs. 10 to 12 through the longitudinal movement of one of the shafts. In these last-mentioned figures the sleeve $c$ is pinned or otherwise rigidly secured to the shaft $a'$, and the shaft is mounted to slide in suitable bearings. (Not shown.) The coupling-jaws $c^2$ and $d'$ are dispensed with and the sleeve $c^3$ is formed with a groove to receive a shipping-lever. The ring-sections $f f$ do not have the inwardly-projecting flanges $f'$ referred to, but are in other respects precisely similar thereto. The shaft $a'$ is provided with a grooved collar $m$, secured thereto, by means of which it and the clutch members mounted thereon may be moved longitudinally toward and from the shaft $a$. By this construction when the shaft $a'$ is idle the sections of the split ring may be drawn out of the transverse planes of the disk or clutch member $b$, so as to be entirely free from engagement therewith. When the clutch mechanism is constructed after this fashion, the shaft may be connected frictionally by sliding the shaft $a'$ forward far enough to advance the sections of the spring over the clutch member $b$ and then shifting the sliding sleeve $h^4$ to clamp the said sections upon the clutch member $b$. Then if it is desired to positively connect the shafts the shaft $a'$ may be still further advanced to slide the sleeve $c$ relatively to the sleeve $e$ to project the clutch member $c'$ into the socket in the clutch member $b$.

Other changes may be made in the construction of the mechanism without departing from the spirit and scope of this invention.

I claim—

1. A clutch comprising two confronting members, one member of which has a sleeve-like hub, ring-sections carried by the last said member and adapted to engage the other member, rotatable power devices for drawing said ring-sections toward or from each other to frictionally connect the said members, a sleeve sliding on the said hub for operating the said rotatable power devices, and means sliding within the said hub for positively connecting the two members.

2. In combination with two shafts, one movable toward the other, of a clutch comprising two confronting members, one of said members mounted on one of said shafts and having a socket, and the other mounted on the other of said shafts, and having a projection to enter said socket to lock said members together, and means for moving one of said shafts toward the other to clutch or unclutch said members.

3. In combination, two shafts placed in axial alinement, a clutch member on each shaft, means for frictionally connecting said members, means carried by one member and adapted to enter a socket in the other member, and means for moving one of said shafts axially for causing said means to enter said socket.

4. A clutch comprising a clutch member provided with a socket in its face, a clutch member confronting the first said clutch member and provided with a projection to enter said socket, means for inserting said projection into said socket to connect the clutch members rigidly together, ring-sections supported by the second said clutch member and adapted to be clamped against the first said clutch member, rotatable power devices supported by the second said clutch member for clamping the ring-sections against the first said clutch member, said power devices comprising a rotatable shaft having means on the ends for engaging and moving the ring-sections, and a sliding sleeve for operating said rotatable power devices whereby the frictional clutching devices may be operated independently of the positive clutching devices.

5. A clutch comprising two confronting members one having a socket and the other having a hub, means passed through said hub to enter the said socket, devices for sliding said means through the hub to cause it to enter the socket and lock the members together, ring-sections carried by one member and arranged to frictionally engage the other member, rotatable power devices for drawing the ring-sections into operative position, and means for rotating said device whereby the said socket-entering means may be operated independently of the said rotatable power devices.

In testimony whereof I have signed my name to this specification, in the presence of two subscribing witnesses, this 20th day of May, A. D. 1897.

ARTHUR G. SARGENT.

Witnesses:
STEPHEN S. JEWETT,
ALICE M. DAVIS.